United States Patent
Hovde et al.

(10) Patent No.: US 11,623,839 B1
(45) Date of Patent: Apr. 11, 2023

(54) TRIM CAP STRUCTURE ASSEMBLY APPARATUS AND METHODS OF USE AND INSTALLATION

(71) Applicants: David John Hovde, Huron, SD (US); Matthew Neal Raymer, Wallace, SD (US); Aaron Ryan Althoff, Watertown, SD (US)

(72) Inventors: David John Hovde, Huron, SD (US); Matthew Neal Raymer, Wallace, SD (US); Aaron Ryan Althoff, Watertown, SD (US)

(73) Assignee: Persona, Inc., Watertown, SD (US)

( * ) Notice: Subject to any disclaimer, the term of this patent is extended or adjusted under 35 U.S.C. 154(b) by 0 days.

(21) Appl. No.: 17/216,782

(22) Filed: Mar. 30, 2021

(51) Int. Cl.
| | |
|---|---|
| *B29C 65/00* | (2006.01) |
| *B65H 35/00* | (2006.01) |
| *B65H 16/00* | (2006.01) |
| *G09F 7/16* | (2006.01) |
| *B29C 65/50* | (2006.01) |
| *B29C 65/78* | (2006.01) |
| *B32B 37/00* | (2006.01) |
| *B32B 37/12* | (2006.01) |

(52) U.S. Cl.
CPC ....... *B65H 35/0033* (2013.01); *B65H 16/005* (2013.01); *G09F 7/16* (2013.01); *B29C 65/50* (2013.01); *B29C 65/5057* (2013.01); *B29C 65/5092* (2013.01); *B29C 65/7894* (2013.01); *B29C 66/45* (2013.01); *B32B 37/0053* (2013.01); *B32B 37/12* (2013.01)

(58) Field of Classification Search
CPC . B29C 65/50; B29C 65/5057; B29C 65/5092; B29C 65/6861; B29C 65/7894; B29C 66/45; B32B 37/0053; B32B 37/12
See application file for complete search history.

(56) References Cited

U.S. PATENT DOCUMENTS

| | | | | |
|---|---|---|---|---|
| 3,675,355 | A | * | 7/1972 | Shanok ............... G09F 13/0404 428/162 |
| 3,760,552 | A | * | 9/1973 | Skoetsch ............. G09F 13/0404 52/800.12 |
| 3,937,384 | A | * | 2/1976 | Minogue ............. G09F 13/0404 40/616 |
| 3,974,552 | A | | 8/1976 | Minogue |
| 4,097,632 | A | | 6/1978 | Minogue |
| 4,701,991 | A | * | 10/1987 | Scheffer, Sr. ............. G09F 7/14 29/450 |
| 7,181,875 | B2 | | 2/2007 | Lewis |
| 8,484,871 | B2 | | 7/2013 | Boyer |
| 9,261,121 | B2 | | 2/2016 | Boyer |
| 9,653,007 | B2 | | 5/2017 | Boyer |
| 9,721,486 | B2 | * | 8/2017 | Yoon ....................... G09F 13/22 |
| 2002/0157511 | A1 | | 10/2002 | Linenberger |
| 2013/0255123 | A1 | | 10/2013 | Boyer |

(Continued)

*Primary Examiner* — Philip C Tucker
*Assistant Examiner* — Nickolas R Harm
(74) *Attorney, Agent, or Firm* — Jeffrey A. Proehl; Woods, Fuller, Shultz & Smith, PC

(57) ABSTRACT

An apparatus for assembling a securing tape on a trim strip to provide a trim cap structure having a base with an assembly path, a spool assembly to dispense tape from a coil, a guide assembly to guide the strip, and an applicator assembly to guide the securing tape to the portion of the trim strip on the assembly path. A method for assembling a sign component for a sign is also disclosed.

15 Claims, 11 Drawing Sheets

(56) References Cited

U.S. PATENT DOCUMENTS

2015/0052711 A1  2/2015  Boyer
2017/0178551 A1  6/2017  Boyer
2021/0350728 A1* 11/2021  Werner ............... G09F 13/0413

* cited by examiner

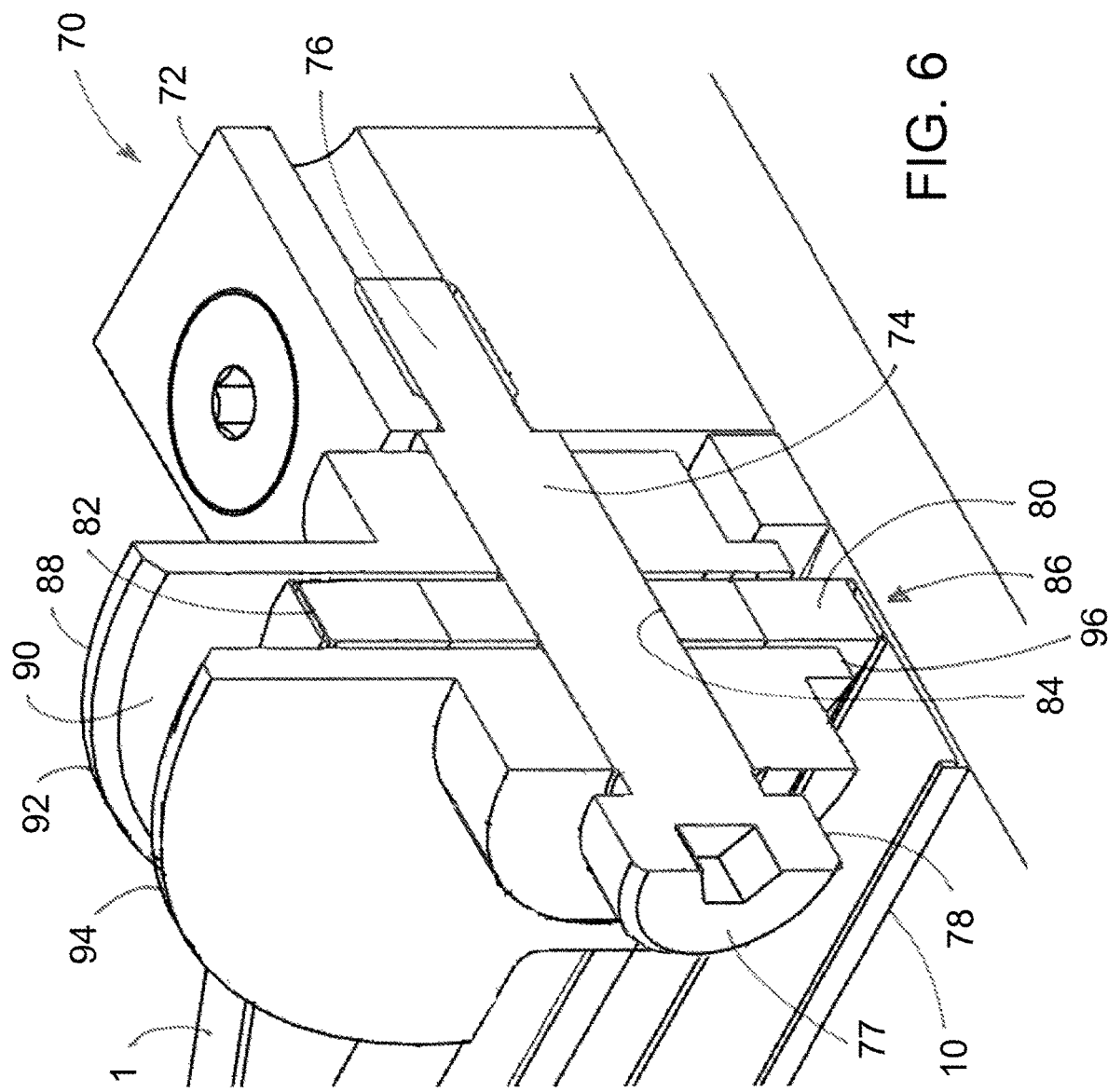

TRIM CAP STRUCTURE ASSEMBLY APPARATUS AND METHODS OF USE AND INSTALLATION

BACKGROUND

Field

The present disclosure relates to signs and more particularly pertains to a new trim cap structure assembly apparatus and methods of use and installation for providing an apparatus which simpler and more efficient assembly of elements of a sign component, particularly sign components utilizing trim caps.

Description of the Prior Art

The employment of "channel letters" in commercial signage is well known, as well as the use of a "trim cap" strip as a border about the plate forming the face of the channel letter as a visual element as well as a means of connecting the face plate to a box positioned behind the face plate that may enclose, for example, a means of illuminating the face.

Conventional practice has been to secure the trim cap strip to a perimeter surface of the face plate through the use of a flowable adhesive that cures to secure the relatively flexible trim cap strip to the perimeter surface of the relatively rigid face plate. Although relatively flexible, the plastic material of the trim cap strip does exhibit a degree of resilience and typically incorporates a metal core, all of which can make it more difficult to hold the trim cap strip in close proximity to the perimeter surface of the face plate for the time period necessary to apply the adhesive and for the adhesive to cure.

During the assembly process, the trim cap strip is usually maintained in close proximity to the perimeter surface of the face plate by placing the face plate on a metal table surface and employing multiple magnets to exert pressure against the trim cap strip once the strip has been positioned against the perimeter surface of the face plate. Often many magnets need to be utilized to produce the close proximity of the trim cap strip to the perimeter surface necessary to form an acceptable bond. The physical effort necessary to correctly position the magnets on the table and against the trim cap strip is typically substantial. Moreover, the process is time-consuming when the time to correctly position the face plate, trim cap strip, and magnets is considered along with the time necessary for the adhesive to cure, as well as the time to release the assembly from the magnets after the adhesive has cured.

An alternative approach is discussed in U.S. Pat. No. 7,181,875 to Lewis that employs the use of a pressure activated adhesive layer on a foam layer. The use of a flowable adhesive is eliminated as the adhesive layers on the opposite sides of the foam layer bond, respectively, to the trim cap strip and the perimeter surface of the face plate. While the resulting structure is shown and discussed, significant details regarding the apparatus and process to achieve the structure are not disclosed in U.S. Pat. No. 7,181,875.

SUMMARY

In one aspect, the present disclosure relates to an apparatus for assembling a securing tape on a trim strip to provide a trim cap structure. The apparatus may comprise a base having a top, with a portion of the top forming an assembly path extending in a longitudinal direction, and a spool assembly mounted on the base and configured to dispense the securing tape from a coil. The apparatus may also comprise a guide assembly mounted on the base and configured to guide a portion of the trim strip along an assembly path. The guide assembly may include a guide fence extending adjacent to the assembly path and having a guide surface positioned to be contacted by a trim strip positioned on the assembly path. The apparatus may further comprise an applicator assembly mounted on the base and configured to guide the securing tape to the portion of the trim strip on the assembly path. The applicator assembly may comprise a mount mounted on the base, and a barrel positioned above the assembly path and rotatable with respect to the mount, and the barrel may have a circumferential applicator surface for a portion of the securing tape to wrap about the applicator surface. The applicator assembly may further comprise guide flanges configured to guide movement of a portion of the securing tape on the applicator surface therebetween. A portion of the barrel may extend below the guide flanges to form a gap between the circumferential applicator surface of the barrel and the top of the base of the assembly path such that a portion of the securing tape on the applicator surface is pressed against a portion of the trim strip on the assembly path.

In another aspect, the present disclosure relates to a method for assembling a sign component for a sign, and may include assembling a trim cap structure comprising securing tape adhered on a trim strip, and attaching the trim cap structure to other elements of a sign component, with the other elements including a plate with a front face and a perimeter with a perimeter surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 6 is a schematic perspective sectional view of portions of the guide and applicator assemblies, according to an illustrative embodiment.

DETAILED DESCRIPTION

Figure 1:
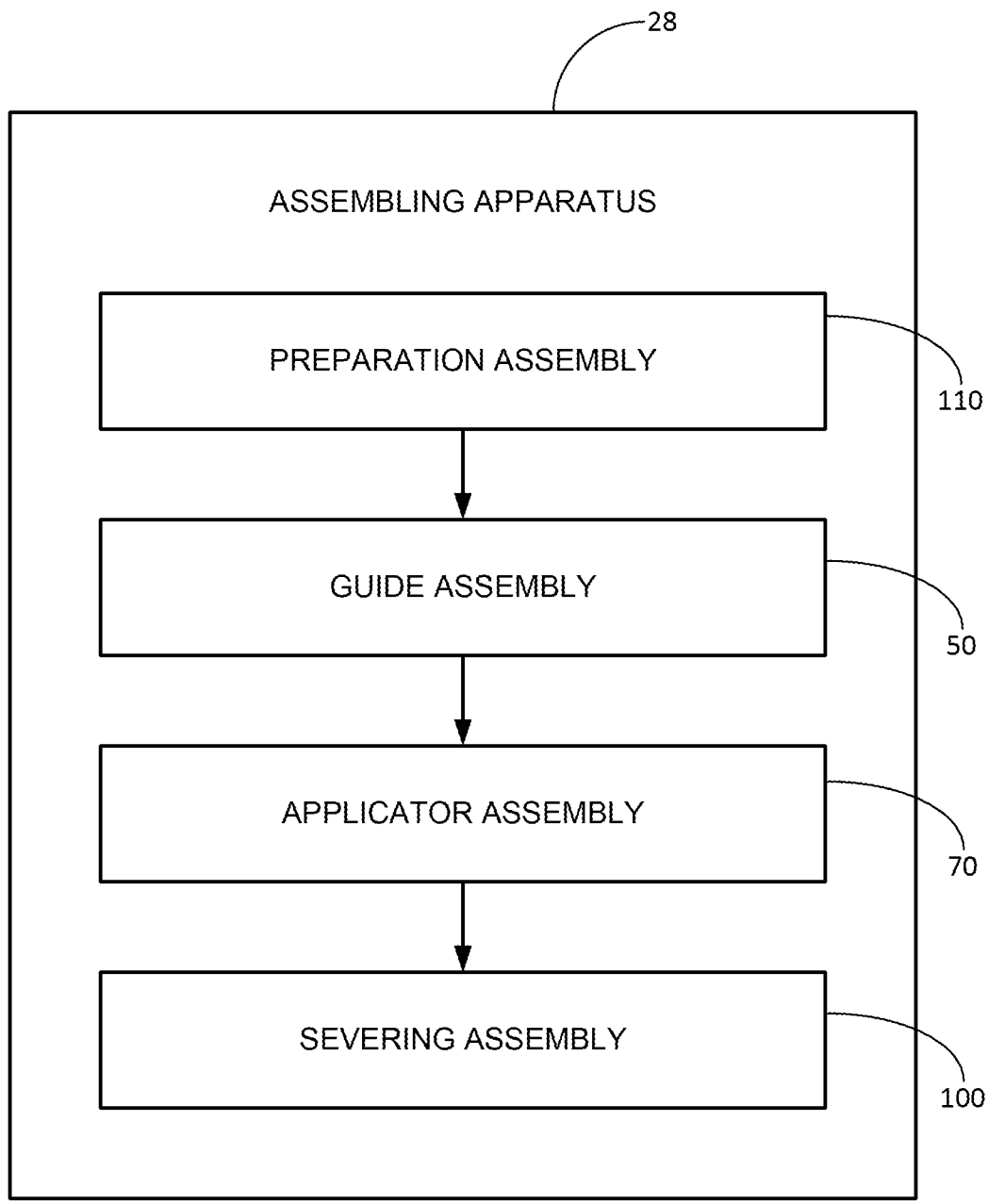
FIG. 1 is a schematic diagram of a new trim cap structure assembly apparatus, according to the present disclosure.
Figure 2:
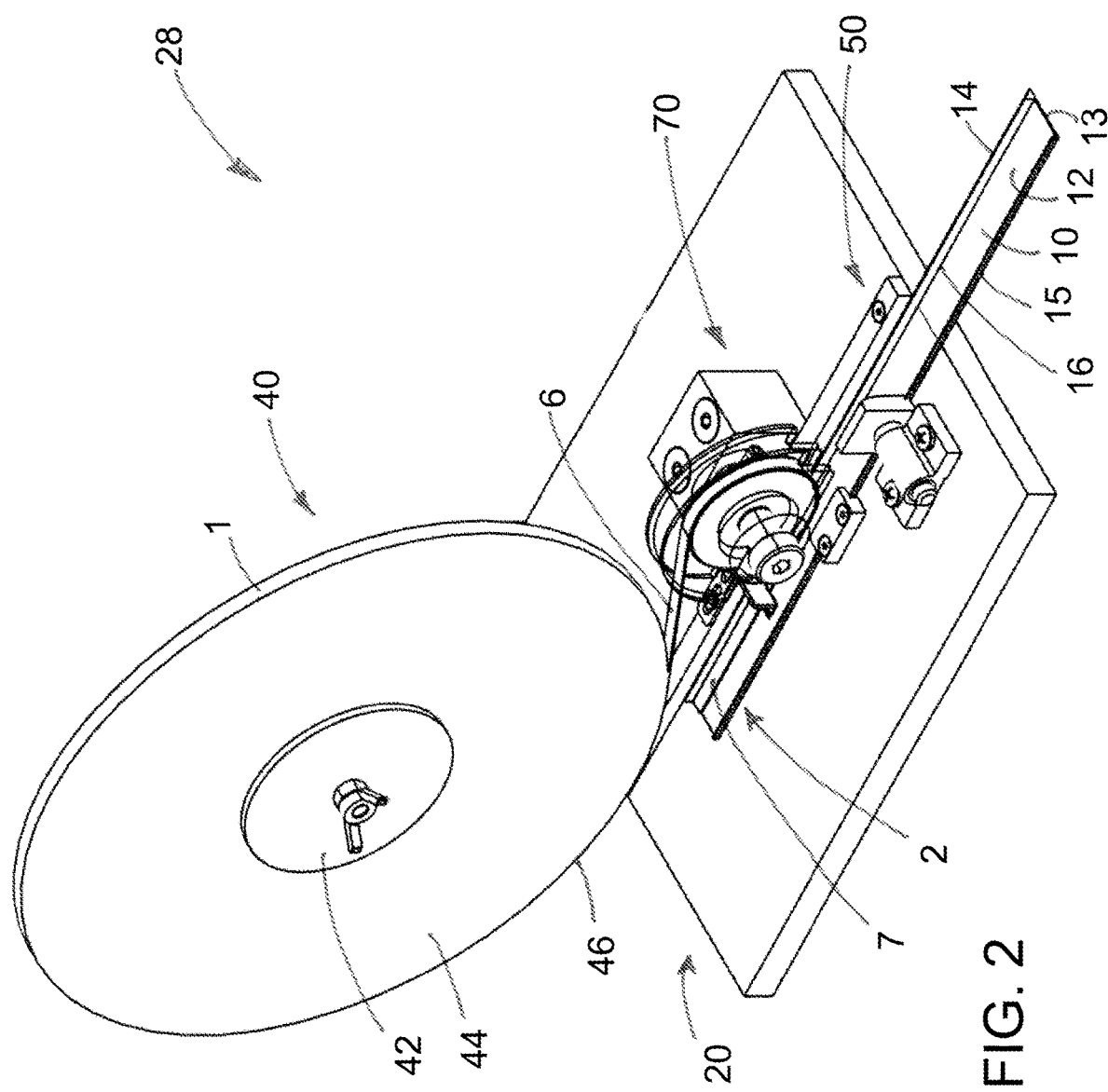
FIG. 2 is a schematic perspective view of an illustrative embodiment of the trim cap structure assembly apparatus shown with a coil of securing tape and length of trim strip, according to the present disclosure.
Figure 3:
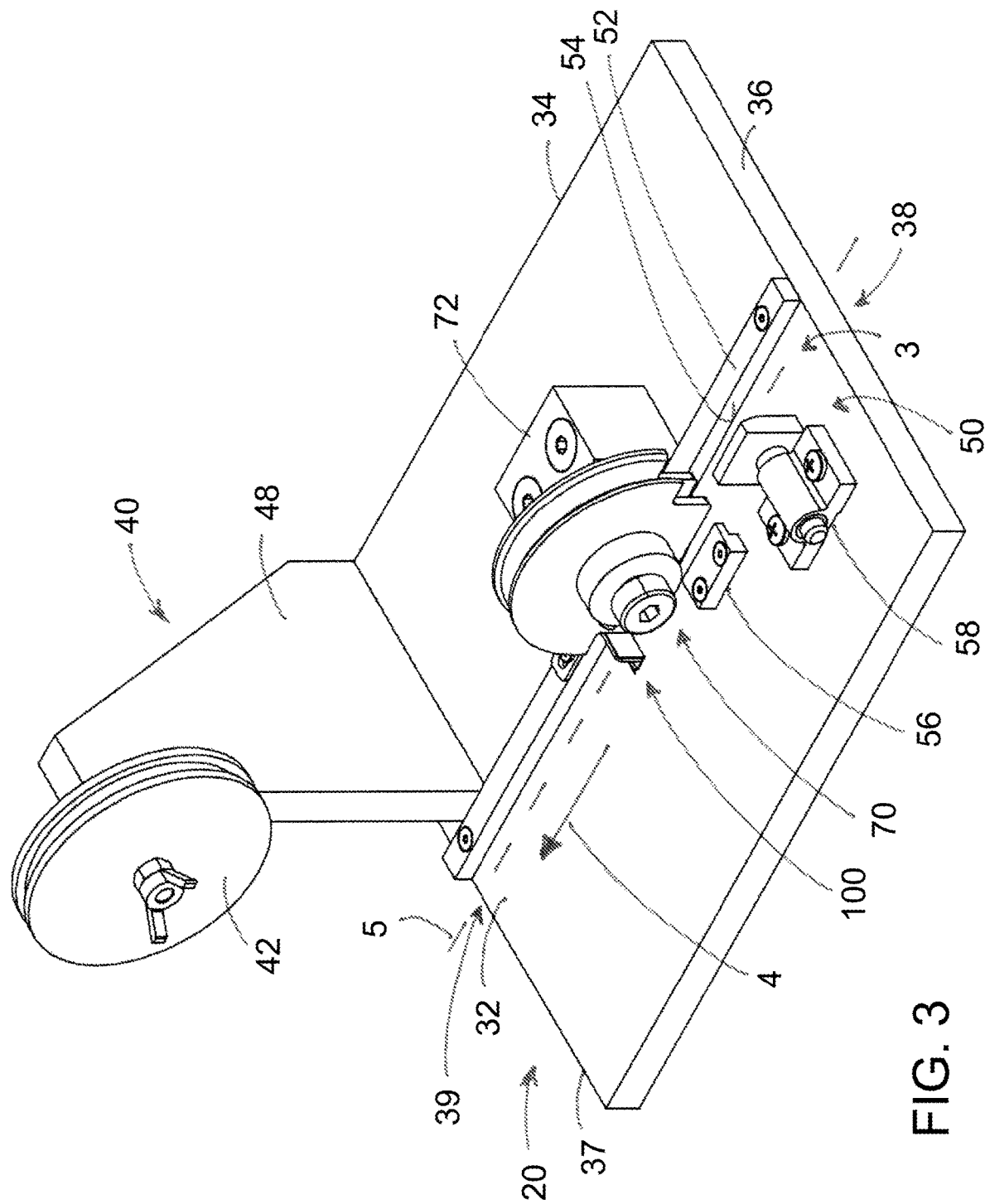
FIG. 3 is a schematic perspective view of the assembly apparatus shown with the coil of tape and length of trim strip removed, according to an illustrative embodiment.
Figure 4:
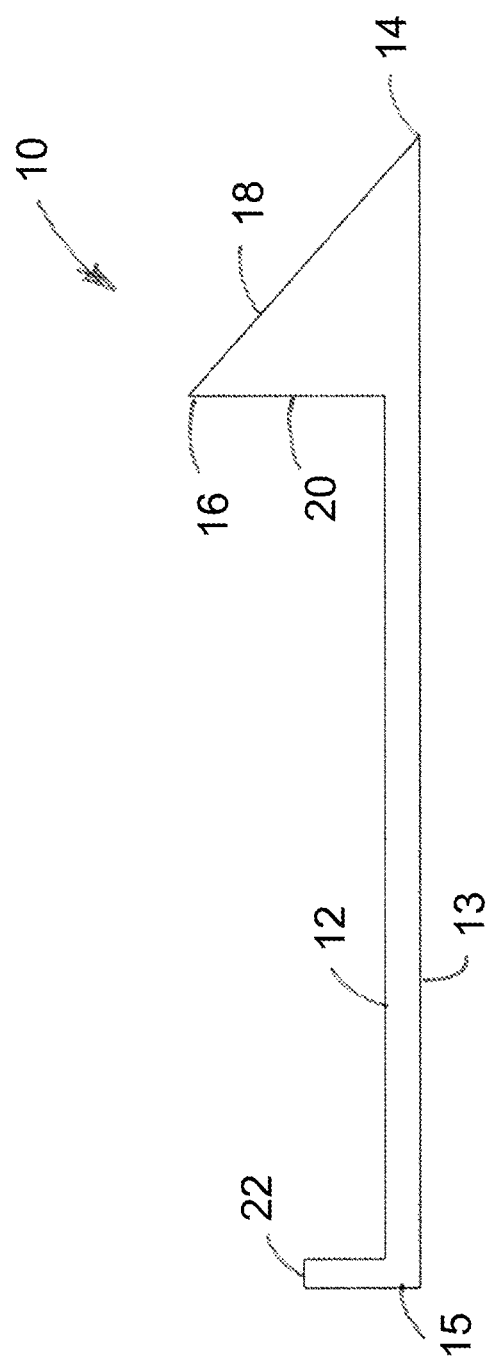
FIG. 4 is a schematic lateral cross section view of an illustrative trim strip element suitable to form the trim cap structure.
Figure 5A:
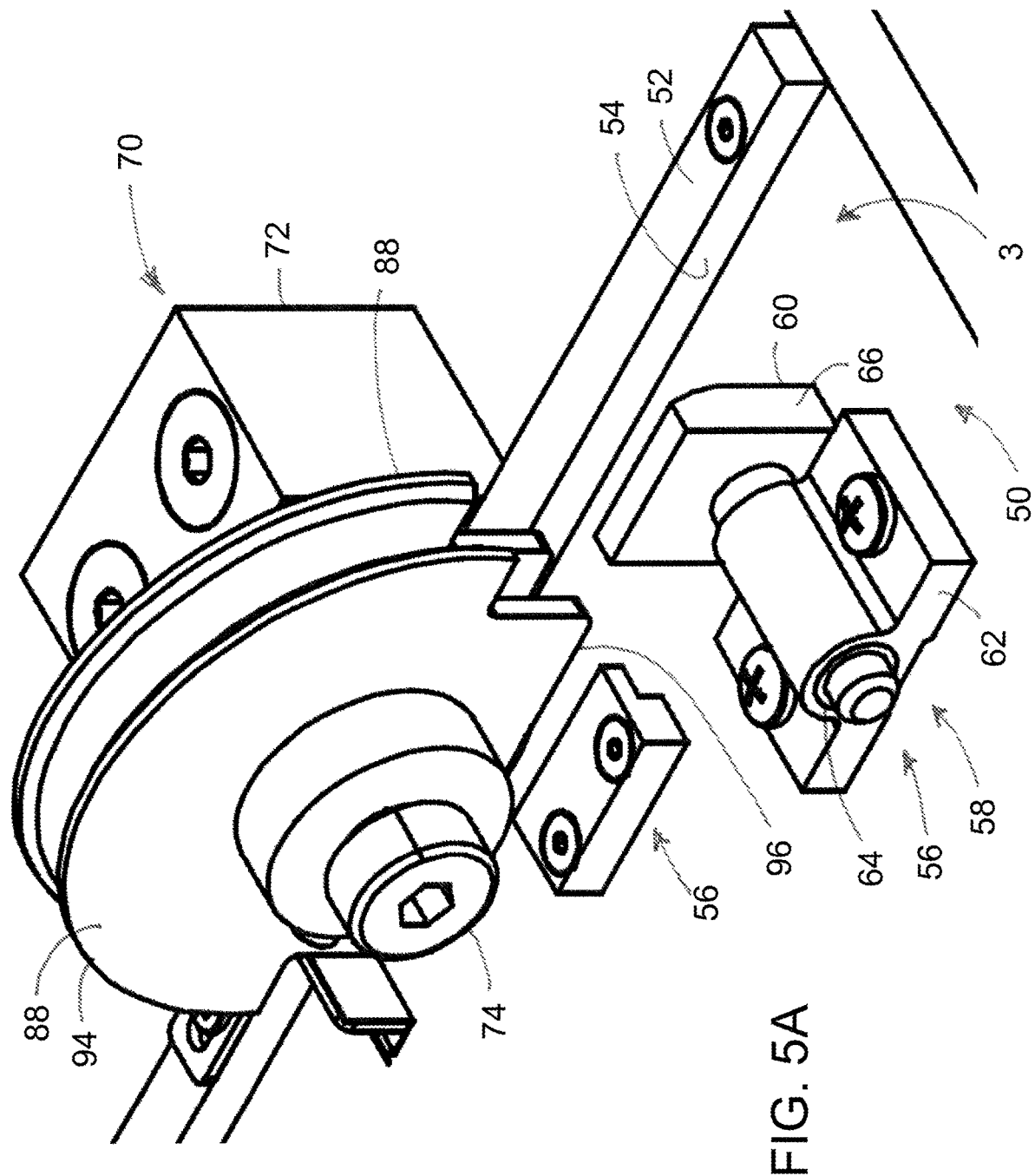
FIG. 5A is a schematic perspective view of an enlarged portion of the assembly apparatus to show detail of the guide and applicator assemblies, according to an illustrative embodiment.
Figure 5B:
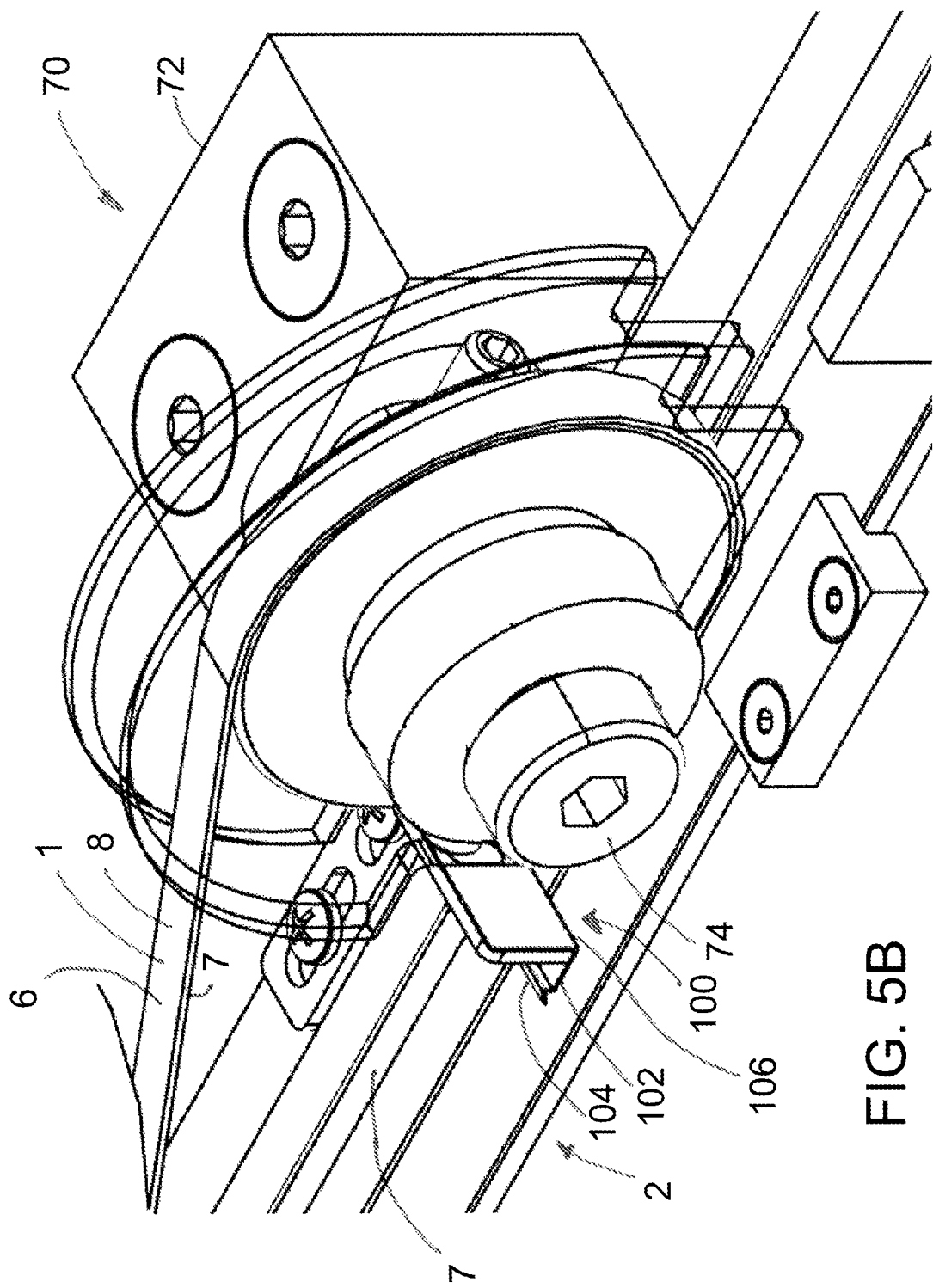
FIG. 5B is a schematic perspective view of the enlarged portion of the assembly apparatus with securing tape and trim strip mounted on the guide and applicator assemblies, and the guide flanges shown in phantom to reveal detail), according to an illustrative embodiment.

With reference now to the drawings, and in particular to FIGS. 1 through 9 thereof, a new trim cap structure assembly apparatus, and methods of use and installation, embodying the principles and concepts of the disclosed subject matter will be described.

The applicants have recognized that the utilization of securing tape with adhesive on opposite faces of the tape to secure a trim cap strip to the perimeter surface of a face plate have advantages over the utilization of a flowable liquid adhesive both in the ease and speed of accomplishing the securement. However, the applicants have also recognized challenges that exist in the assembly of the securing tape 1 and trim strip 10 to form a trim cap structure 2 in a consistent and effective manner, and have thus developed an apparatus for assembling a trim cap structure as well as a corresponding method or process.

The applicants have also recognized that application of the tape 1 to the strip 10 may be implemented in the process of assembling various elements into a sign component in a way that provides additional advantages. For example, in situations where the application of a coating, such as paint, to the trim strip 10 is desired, the paint is typically not applied to those surface portions of the strip 10 to which the tape 1 is to be adhered, and a separate masking step has been performed to protect those surface portions from paint overspray. In implementations of the present disclosure, the securing tape 1 may be applied to the trim strip 10 prior to (rather than after) application of the coating such that the securing tape 1 (or a release liner applied to the tape 1) functions to mask off portions of the surface of the strip 10 which would otherwise have to be masked off by other means if the coating were to be applied to the strip 10 prior to application of the tape 1 to the strip 10. In such an approach, a step of masking off portions of the trim strip (to which the tape 1 is to be adhered) using masking tape or the equivalent may be eliminated, eliminating the use of those materials as well as the time and labor required to apply and remove the masking tape.

In one aspect, the disclosure relates to an apparatus 28 for assembling a securing tape 1 on a trim strip 10 to provide a trim cap structure 2 for a sign component (see, e.g., FIGS. 1 through 6). In general, the apparatus 28 may include a base 30 for positioning on a surface or otherwise being supported in a manner suitable for use, a spool assembly 40 configured to dispense the securing tape 1, a guide assembly 50 configured to guide a portion of the trim strip along an assembly path 3, an applicator assembly 70 configured to guide the securing tape, and a severing assembly 100 configured to sever either or both of the tape 1 and strip 10. At least a portion of the trim strip 10 may move along the assembly path 3 in an assembly direction 4, and at least a portion of the path 3 may be elongated in a linear manner with a longitudinal axis 5 extending generally in the assembly direction.

In greater detail, securing tape suitable for use with the apparatus 28 may be of the type having opposite faces 6, 7 and an adhesive 8 being located on at least one of the faces. In some of the most preferred implementations, adhesive is positioned on both of the opposite faces 6, 7 of the tape 1 to permit the tape to secure an element adhered to the adhesive on one face to an element adhered to the adhesive on the opposite face. One highly suitable example of securing tape is available under the tradename VHB Tape 4936 from 3M Company of St. Paul, Minn. 55144. A liner strip may be positioned on at least one of the faces on which adhesive is applied having adhesive applied thereto Trim strips suitable for use with the apparatus 28 may have an inner surface 12 and an outer surface 13. When positioned along the assembly path 3 for operation of the apparatus, the inner surface 12 may be oriented in a generally upward direction and the outer surface 13 may be oriented in a generally downward direction. The trim strip 10 may have a front edge 14 and a rear edge 15, with the front edge being generally intended for orienting so as to form a portion of the front of the sign element while the rear edge is intended for orienting away from the front of the sign element. In some embodiments, the trim strip 10 may have a ridge 16 protruding with respect to the inner surface 12, and the ridge may extend longitudinally with respect to the length of the trim strip. The ridge 16 may be located toward the front edge 14 of the trim strip, and may form a beveled surface 18 located adjacent to the front edge and oriented at an oblique angle with respect to the inner surface. The ridge 16 may have a rear surface 20 which may be oriented toward the rear edge 15 of the trim strip and may be oriented substantially perpendicular to the inner surface 12 of the trim strip. The trim strip 10 may also have a rib 22 which protrudes from the inner surface and extends longitudinally with respect to the length of the strip. The rib 22 may be positioned toward and along the rear edge 15 of the trim strip. Optionally, the inner surface 12 may be prepared for application of the tape strip 1 by, for example, cleaning portions of the inner surface to which the tape surface is to be adhered.

In greater detail, the base 30 of the apparatus may have a top 32 which may be a surface forming a portion of the assembly path 3 along which a portion of the trim strip 10 is moved. The base 30 may have a peripheral edge 34 which in turn may have a first end 36 and a second end 37. The assembly path 3 may have an entry end 38 located at or adjacent to the first end 36 of the base, and path 3 may have an exit end 39 located at or adjacent to the second end 37 such that the trim strip moves from the entry end toward the exit end along the assembly path.

The spool assembly 40 of the apparatus 28 may be mounted on the base 30 in a suitable position and orientation to dispense the securing tape 10 for mating the tape 1 to the strip 10. The spool assembly 40 may include a spool 42 which is rotatable with respect to the base, and may be positioned at a location raised or elevated above the top 32 of the base, such as above and vertically aligned with the assembly path 3. The spool 42 may have a coil 44 of a length of the securing tape wound thereon, and the assembly 40 may be adapted to facilitate the mounting of a coil of the tape 1 on the spool, such as by the removability of one of the flanges of the spool 42 from other elements of the spool to install the coil on the spool. The coil 44 may have a perimeter 46 from which portions of the securing tape are payed out. The spool assembly 40 may also include a stanchion 48 supporting the spool 42 on the base 30, and the stanchion may extend upwardly from the top of the base. The spool 42 may be rotatably mounted on the stanchion 48 in a manner such that the spool is rotatable with respect to the base.

The guide assembly 50 of the apparatus 28 may engage a portion of the trim strip 10 positioned along the assembly path 3 to guide sliding movement of the trim strip along the path 3, and may also help to ensure that the trim strip is properly oriented on the path. The guide assembly 50 may include a guide fence 52 mounted on the base, and the guide fence may have a guide surface 54 which may extend upwardly from the top 32 of the base at locations generally adjacent to the assembly path 3. Illustratively, the front edge 14 of the trim strip 10 may about against and move along the guide surface 54 as the strip 10 moves along the assembly path 3. The guide assembly 50 may also include a guide retainer 56 which is configured to resist movement of the trim strip 10 away from the top 3 of the base as the strip moves along the assembly path 3. The guide retainer 56 may be mounted on the base and positioned in opposition to the guide fence (and the guide surface 54) with respect to the assembly path. The guide retainer 56 may be positioned adjacent to the path 3, and in some embodiments, a portion of the guide retainer 56 may extend over the path 3. Optionally, the The guide assembly 50 may further include a biasing guide 58 configured to bias or press the trim strip against the guide fence 52 and the guide surface 54 thereon. The biasing guide 58 may have a biasing surface 60 for contacting the trim strip at a location (such as along the rear edge 15) opposite of a location (such as along the front edge 14) on the trim strip which contacts the guide fence 52. In illustrative embodiments, the biasing guide 58 may include a stationary element 62 which is mounted on the base 30 and may define a channel 64 extending along an axis generally oriented perpendicular to the plane of the guide surface 54 as well as the longitudinal axis 5. The biasing guide 58 may further include a movable element 66 which has the biasing surface 60 thereon. The movable element 66 may be mounted on the stationary element 62, and may be movable with respect to the stationary element toward and away from the assembly path 3 as well as the guide surface 54. Illustratively, a portion of the movable element 66 may be positioned in the channel 64 of the stationary element to guide movement of the element 66. In some embodiments, the movable element 66 may have a slot formed therein for receiving a portion of the rib 22 of the trim strip 10 as the strip is positioned on, and moves along, the assembly path 3.

The applicator assembly 70 of the apparatus 28 may include a mount 72 mounted on the base 30, and the mount may extend upwardly from the top of the base. The applicator assembly 70 may further include an axle 74 mounted on the mount 72. The axle 74 may extend to locations proximate to the assembly path 3, and may extend over the path 3. The axle 74 may have an inboard end 76 that is mounted on the mount 72, and an outboard end 77 opposite of the inboard end. The axle 74 may have a flange 78 at the outboard end. In the illustrative embodiments, the axle 74 is formed by a bolt fastener with threads that are threaded into a threaded aperture formed in the mount 72. In other implementations, the axle 74 may comprise a shaft mounted on or incorporated with the mount 72, and a securing knob may be removably mounted on the outboard end of the axle, such as by a threaded aperture formed on the knob for receiving the outboard end of the axle, which may be exteriorly threaded in a complementary manner.

The applicator assembly 70 may additionally include a barrel 80 that is rotatable with respect to the mount 72. The barrel 80 may be positioned above the assembly path 3, and may be mounted on the axle 74. The barrel 80 may have a circumferential applicator surface 82 and a portion of the securing tape 1 may be wrapped about the applicator surface 82. The barrel 80 may define a passage 84 with a portion of the axle 74 passing through the passage such that the barrel is rotatable about the axle. A gap 86 may be formed between the circumferential applicator surface 82 of the barrel and the portion of the top 32 of the base 30 which forms the assembly path, and a portion of the trim strip 10 on the path 3 as well as a portion of the tape 1 on the applicator surface 82 may be positionable in the gap 86.

The applicator assembly 70 may have guide flanges 88 which are configured to guide movement of a portion of the securing tape 1 positioned therebetween. The guide flanges 88 may comprise a pair of guide flanges having the barrel 80 being positioned between the guide flanges. In some embodiments, the guide flanges 88 do not rotate with the axle 74 or with the barrel 80. The guide flanges 88 may each have a guide surface 90, and the guide surfaces of each flange 88 may extend radially outwardly from the applicator surface 82 of the barrel. Further, the guide surfaces 90 of the flanges may be oriented in opposition to each other, with the presence of the barrel between the flanges creating a space between the surfaces 94 passage of a portion of the securing tape 1. Illustratively, each of the guide flanges 88 may have a perimeter edge 92 which may include a semicircular portion 94 and a linear portion 96. The linear portion 96 may be oriented toward the top 32 of the base, and may be positioned adjacent to the assembly path with a separation between the linear portion and the top being sufficient to permit passage of the trim strip 10 therebetween. In some embodiments, a portion of the barrel 80 may extend below the perimeter edges 92 of the guide flanges, and specifically the linear portion 96.

The severing assembly 100 of the apparatus 38 may be configured to sever the securing tape and/or the trim strip 10 at a location along the assembly path 3. Illustratively, the severing assembly 100 may include a blade 102 which may at least partially extend above the assembly path 3. The blade 102 has a cutting edge 104 which extends substantially perpendicular to the longitudinal axis 5 of the assembly path 3. The cutting edge 104 may also extend substantially parallel to the top of the base. The severing assembly 100 may also include a blade support 106 which is configured to support the blade 102 in a position above the assembly path 3. The blade support 106 may be mounted on the guide assembly 50, and may be mounted on the guide fence to extend outwardly from the guide fence 52. A degree of deflection of either the blade 102 or the blade support 106, or a combination thereof, may permit the cutting edge 104 to be moved downwardly toward and into contact with the tape 1 and the trim strip 10 so that the blade 102 is able to cut into and through the tape and optionally the trim strip.

In some embodiments, the apparatus 28 may include a preparation assembly 110 configured to prepare the trim strip 10 for the application of the securing tape 1 to the strip 10. The preparation assembly 110 may apply a substance to the trim strip 10, and more specifically the inner surface 12 of the strip. In some implementations, the substance may have the effect of cleaning or priming the portion of the inner surface 12 to which the substance is applied to enhance the quality and thus the strength of the bond between the adhesive 8 on the tape and the surface 12. The substance may have a liquid form. Illustratively, the preparation assembly 110 may include an applicator element or pad positioned on the base 30 to contact portions of the inner surface 12 of the trim strip 10 to which the tape 1 is to be adhered, and may be configured to apply the substance to the strip 10 as the strip moves along the assembly path 3 prior to the portion of the strip 10 reaching the applicator assembly 70 where the tape 1 is joined to the strip 10. A supply of the substance may be contained in a tank or other vessel capable of holding a quantity of the substance, and a conduit or tube may connect the interior of the tank to the applicator pad in a manner that supplies the substance to the applicator pad to keep the pad moistened with the substance.

Figure 7:
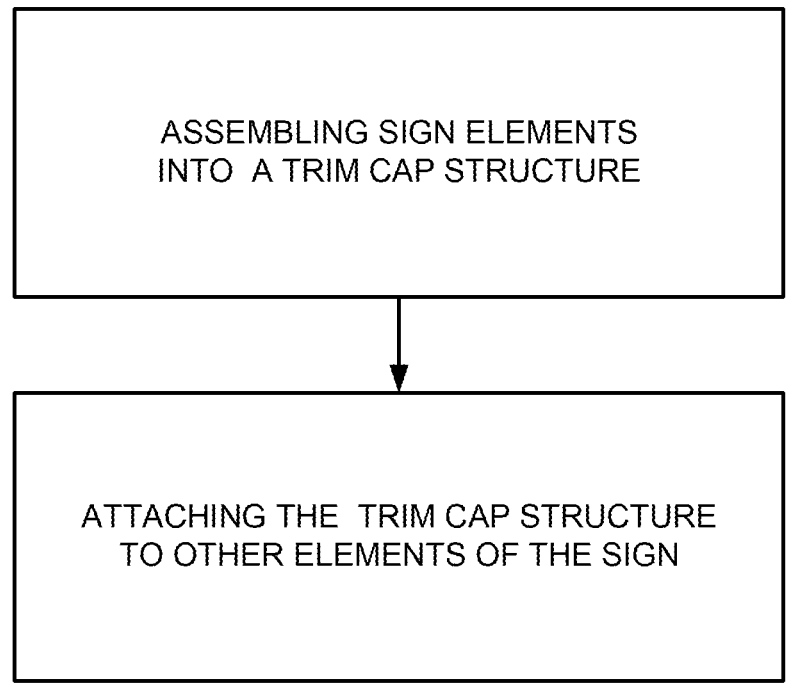
FIG. 7 is a schematic flow diagram of aspects of a method according to an illustrative implementation.
Figure 8A:
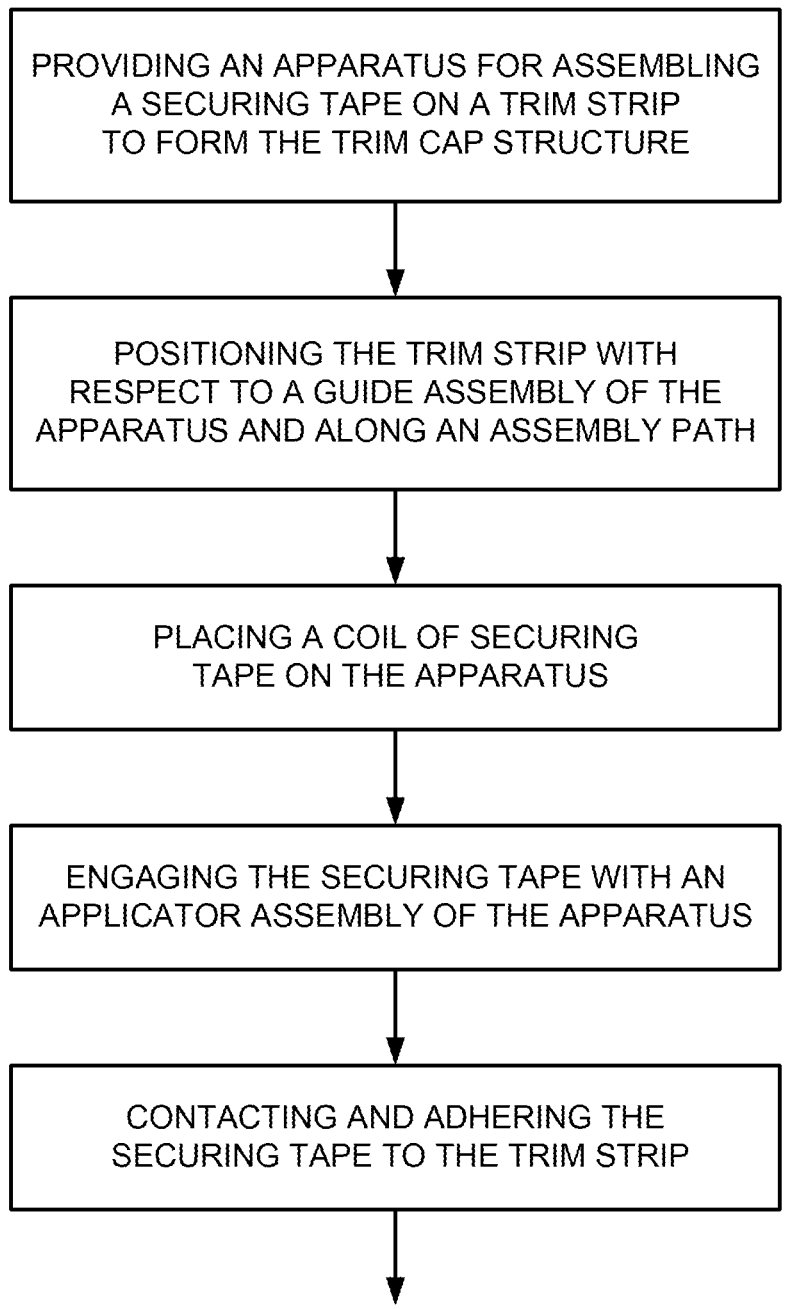
FIG. 8A is a schematic flow diagram of more detailed aspects of the method according to an illustrative implementation.
Figure 8B:
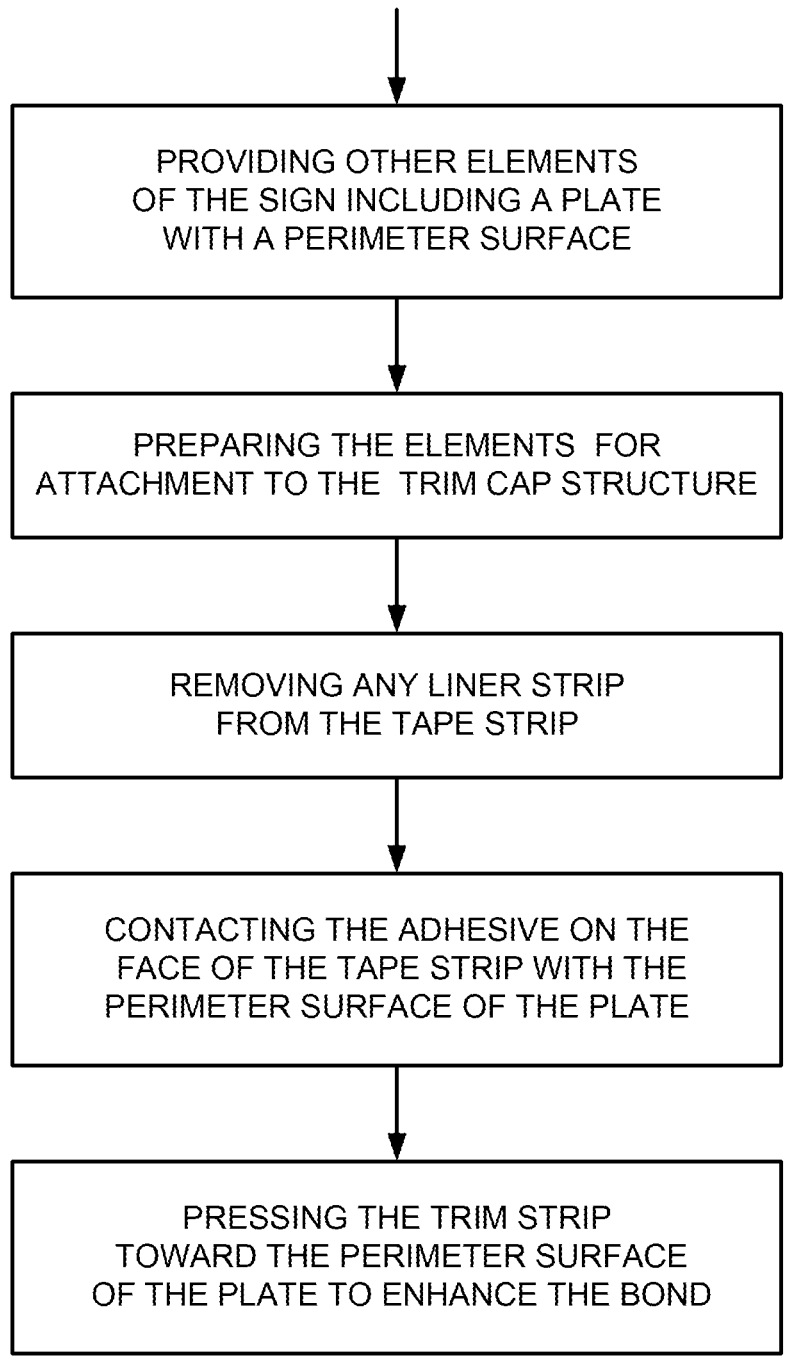
FIG. 8B is a schematic flow diagram of additional aspects of the method according to an illustrative implementation.
Figure 9:
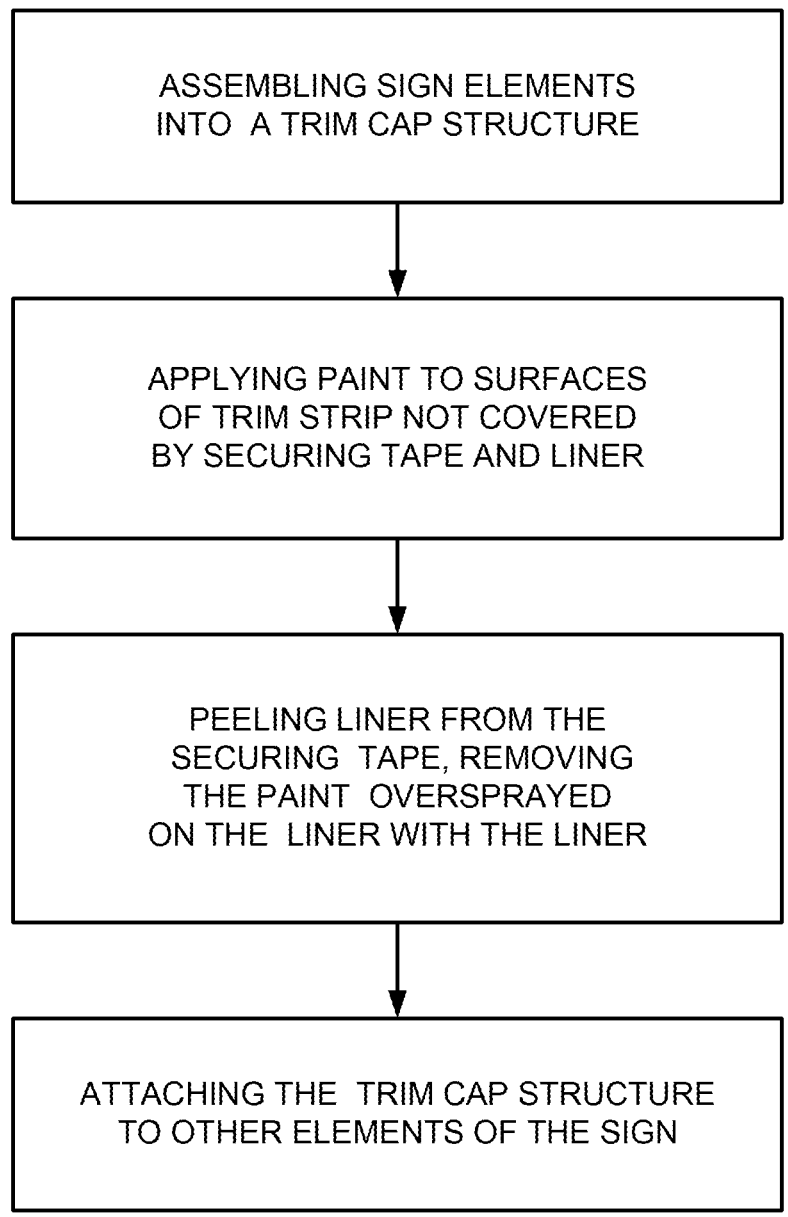
FIG. 9 is a schematic flow diagram of a method with additional steps according to an illustrative implementation of the method.

In another aspect, the disclosure relates to a method for assembling elements of a sign, and which may include assembling a trim cap structure 2 and attaching the trim cap structure to other elements of the sign (see, e.g., FIGS. 7 through 9).

In greater detail, the performance of assembling the trim cap structure may include providing an apparatus for assembling a securing tape on a trim strip to provide the trim cap structure. The apparatus may include some or all of the elements set forth in this description with respect to the apparatus 28.

Assembling the trim cap structure may further include positioning a portion of a trim strip 10 on the assembly path 3 of the apparatus 28 and a location adjacent to the applicator assembly 70, and may also include abutting the portion of the trim strip 10 against the guide fence 52 of the guide assembly 50. Assembling the trim cap structure 2 may still further include sliding the portion of the trim strip 10 between the guide surface 54 of the guide fence and the biasing guide 58, and inserting the portion of the trim strip between a portion of the guide retainer 56 and the base 30 of the apparatus 28. Assembling the trim cap structure may further include moving the portion of the trim strip 10 to a position below the applicator assembly 70 and beneath the barrel of the applicator assembly of the apparatus 28. The applicator surface of the barrel may be located in close proximity to the inner surface 12 of the trim strip 10.

Additionally, assembling the trim cap structure 2 may include placing a coil 44 of securing tape 1 on a spool assembly 40 of the apparatus, and unwinding a portion of the securing tape 1 from the coil. Trim cap structure assembly may also include engaging the portion of the securing tape 1 with the applicator assembly 70 of the apparatus, and entraining the portion of the securing tape on the applicator assembly by positioning the tape between the guide surfaces of the guide flanges 88. Further, wrapping of the portion of the securing tape about the circumferential applicator surface 82 on the barrel 80 of the applicator assembly may be performed.

Further actions involved in the assembling of the trim cap structure 2 may include contacting the portion of the securing tape 1 engaged with the applicator assembly with a section of the portion of the trim strip 10 located below the applicator assembly 70, and adhering the face 6 of the securing tape having the adhesive 8 thereon to the inner surface 12 of the trim strip. Also, advancing the portion of the trim strip 10 along the assembly path with the portion of the securing tape adhered thereon may be performed to pull the portion of the securing tape through the applicator assembly and unwind further portions of the securing tape from the coil of the securing tape to the applicator assembly.

In some implementations, particularly for processes in which the trim strip 10 is to be coated, for example, with paint in order to alter the outward appearance or color of the strip 10, application of the securing tape 1 (and a release liner on the tape) to the strip 10 prior to coating of the strip 10 may function to mask a portion of the strip 10 from being coated with the paint being applied to the trim strip (see, e.g., FIG. 9). After the coating of the trim strip is completed, removal of the liner from the tape 1 exposes the uncoated or unpainted tape which has been protected from the application of paint by the presence of the liner. Thus, in contrast to a process in which the trim strip 10 is painted prior to the application of the securing tape 1, which requires a separate masking application step to keep portions of the inner surface 12 of the strip 10 free of the paint to provide a suitable surface for the adhesion of the tape 1, the separate masking step is illuminated.

The performance of attaching the trim cap structure to other elements of a sign component, which may present a visualization of, for example, a character such as a letter or number, a symbol, or other graphical objects, may include providing the other elements of the sign, such as a plate forming a front face of the sign component. The plate may have a perimeter in the shape of the visualization to be produced, and the perimeter may be formed by a surface. The surface of the perimeter is generally oriented substantially perpendicular to a plane of the front face of the plate. Attaching the trim cap structure may further include preparing the other elements for attachment to the trim cap structure, such as by cleaning at least a portion of the surface of the perimeter of the plate and by applying a cleaning substance to the portion of the perimeter surface. This step may include applying a primer substance to the perimeter surface of the plate.

In some implementations, performance of attaching the trim cap structure 2 may include removing a liner strip from the tape strip to expose adhesive positioned on one of the faces of the tape strip (e.g., the face of the strip not adhered to the trim strip), and then contacting the adhesive on the (exposed) face to a portion of the perimeter surface of the plate. Application of pressure to the outer surface 13 of the trim strip 10 may be performed to force the adhesive on the face of the tape against the perimeter surface of the plate to create, or further enhance, the adhesive bond between the tape and the perimeter surface of the plate, and thereby the adhesive bond between the trim cap structure and the plate.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method for assembling a sign component for a sign, the method comprising:
   assembling a trim cap structure comprising securing tape adhered on a trim strip, assembling the trim cap structure including:
   providing an apparatus for assembling securing tape on the trim strip to provide the trim cap structure, the apparatus defining an assembly path having a first longitudinal direction of movement for a portion of the trim strip along the assembly path, the apparatus including:
   a base having a surface forming the assembly path along which the portion of the trim strip moves with respect to the base; and
   an applicator assembly with a circumferential applicator surface at least partially positioned above the assembly path, the applicator assembly comprising:
   a barrel positioned above the assembly path and rotatable with respect to the base, the barrel having a circumferential applicator surface thereon, a portion of the barrel forming a gap between the circumferential applicator surface of the barrel and the surface of the base forming the assembly path;
   positioning the portion of the trim strip on the assembly path of the apparatus;
   withdrawing a portion of the securing tape from a coil;
   contacting, in the gap, a section of the portion of the securing tape with the portion of the trim strip on the assembly path; and
   pressing the section of the portion securing tape in the gap against the portion of the trim strip on the assembly path by the barrel of the applicator assembly; and
   attaching the trim cap structure to other elements of a sign component, the other elements including a plate with a front face and a perimeter with a perimeter surface.

2. The method of claim 1 wherein assembling a trim cap structure includes:
   placing the coil of securing tape on a spool assembly of the apparatus; and
   unwinding a portion of the securing tape from the coil.

3. The method of claim 1 wherein attaching the trim cap structure includes
   preparing the other elements for attachment to the trim cap structure;
   removing a liner strip from the securing tape of the trim cap structure to expose adhesive positioned on one of the faces of the securing tape; and
   contacting the adhesive on the one of the faces of the securing tape with a portion of the perimeter surface of the plate.

4. The method of claim 3 wherein preparing the other elements includes cleaning the perimeter of the plate by applying a primer substance to the surface of the perimeter of the plate.

5. The method of claim 1 wherein attaching the trim cap structure includes:
   applying pressure to the outer surface of the trim strip to force the adhesive on the face of the securing tape against the perimeter surface of the plate.

6. The method of claim 1 wherein assembling the trim cap structure includes engaging the portion of the securing tape with the applicator assembly by entraining the portion of the securing tape on the applicator assembly.

7. The method of claim 1 wherein the applicator assembly has a substantially circular circumferential applicator surface against which the securing tape is engaged, and
   wherein assembling the trim cap structure includes engaging the portion of the securing tape with the applicator assembly by wrapping the portion of the securing tape about the substantially circular circumferential applicator surface of the applicator assembly.

8. The method of claim 1 wherein assembling the trim cap structure includes:
   positioning a portion of the trim strip on the assembly path by moving the portion of the trim strip to a position below a barrel of the applicator assembly and over a surface forming a portion of the assembly path; and
   locating the circumferential applicator surface of the barrel of the applicator assembly in close proximity to an inner surface of the trim strip to press the securing tape against the trim strip.

9. The method of claim 1 wherein providing the apparatus includes:
   providing the applicator assembly with a spool assembly configured to dispense the securing tape from the coil to the applicator assembly.

10. The method of claim 1 wherein providing the apparatus includes:
    providing the apparatus with a guide assembly configured to guide a portion of the trim strip along the assembly path.

11. The method of claim 1 wherein withdrawing the portion of the securing tape from the coil includes:
   extending an upper extent of the portion of the securing tape from the coil to the applicator assembly;
   wrapping an intermediate extent of the portion of the securing tape about the circumferential applicator surface of the applicator assembly; and
   extending a lower extent of the portion of the securing tape from the circumferential applicator surface to the portion of the trim strip on the assembly path.

12. The method of claim 11 wherein assembling the trim cap structure further includes:
   advancing the portion of the trim strip along the assembly path with the section of the lower extent of the securing tape adhered thereon in the first longitudinal direction of movement to cause:
      the lower extent of the portion of the securing tape to move in the first longitudinal direction of movement with the portion of the trim strip;
      the intermediate extent of the portion of the securing tape to move about the circumferential applicator surface of the applicator assembly; and
      the upper extent of the portion of the securing tape to move from the coil to the applicator assembly in a second longitudinal direction of movement which is substantially opposite to the first longitudinal direction of movement;
      thereby pulling the portion of the securing tape through the applicator assembly and unwinding further portions of the securing tape from the coil of the securing tape.

13. The method of claim 11 wherein contacting the intermediate extent of the portion of the securing tape engaged with the applicator assembly includes adhering a face of the securing tape having the adhesive thereon to an inner surface of the trim strip.

14. A method for assembling a sign component for a sign, the method comprising:
   assembling a trim cap structure comprising securing tape adhered on a trim strip: and
   attaching the trim cap structure to other elements of a sign component, the other elements including a plate with a front face and a perimeter with a perimeter surface;
   wherein assembling the trim cap structure includes:
      positioning a portion of the trim strip on an assembly path;
      placing a coil of securing tape on a spool assembly; and
      unwinding a portion of the securing tape from the coil;
   wherein positioning a portion of the trim strip on the assembly path includes:
      abutting the portion of the trim strip against a guide fence; and
      sliding the portion of the trim strip between the guide fence and a biasing guide.

15. A method for assembling a sign component for a sign, the method comprising:
   assembling a trim cap structure comprising securing tape adhered on a trim strip: and
   attaching the trim cap structure to other elements of a sign component, the other elements including a plate with a front face and a perimeter with a perimeter surface;
   wherein assembling the trim cap structure comprises providing an apparatus including:
      a base having a surface forming an assembly path along which a portion of the trim strip moves with respect to the base; and
      an applicator assembly configured to guide the securing tape to the portion of the trim strip on the assembly path, the applicator assembly comprising:
         a barrel positioned above the assembly path and rotatable with respect to the base, the barrel having a circumferential applicator surface for a portion of the securing tape to wrap about the applicator surface;
         wherein a portion of the barrel forms a gap between the circumferential applicator surface of the barrel and the surface of the base forming the assembly path such that a portion of the securing tape on the applicator surface is pressed against the portion of the trim strip on the assembly path by the barrel;
   wherein providing the apparatus includes:
      providing the applicator assembly with guide flanges positioned on opposite sides of the circumferential applicator surface of the barrel to guide movement of a portion of the securing tape on the applicator surface.

* * * * *